July 19, 1966  A. B. SMITH  3,261,925
STEREOPHONIC PHOTOELECTRIC TRANSDUCER
Filed Oct. 6, 1960  3 Sheets-Sheet 1

INVENTOR.
ALBERT B. SMITH
BY
Schramm, Kramer + Sturges
ATTORNEYS

July 19, 1966 A. B. SMITH 3,261,925
STEREOPHONIC PHOTOELECTRIC TRANSDUCER
Filed Oct. 6, 1960 3 Sheets-Sheet 2

INVENTOR.
ALBERT B. SMITH
BY
Schramm, Kramer & Sturges
ATTORNEYS.

July 19, 1966  A. B. SMITH  3,261,925
STEREOPHONIC PHOTOELECTRIC TRANSDUCER
Filed Oct. 6, 1960  3 Sheets-Sheet 3

INVENTOR.
ALBERT B. SMITH
BY
Schramm, Kramer & Sturges
ATTORNEYS.

United States Patent Office 3,261,925
Patented July 19, 1966

3,261,925
STEREOPHONIC PHOTOELECTRIC TRANSDUCER
Albert B. Smith, Cleveland, Ohio, assignor to A. Bernard Smith Laboratories, Inc., a corporation of Ohio
Filed Oct. 6, 1960, Ser. No. 60,850
16 Claims. (Cl. 179—100.41)

This application is a continuation in part of my co-pending application, Serial No. 780,406, filed December 15, 1958, for "Semi-Conductor Photoelectric Stereophonic Phonograph Cartridge," now abandoned.

This application relates to photoelectric conversion of motion into electrical energy and concerns particularly photoelectric transducers responsive to displacement, velocity and acceleration.

An object of the invention is improvement in the stereophonic reproduction of sound.

An object of the invention is to provide sturdy, reliable, highly sensitive transducers which may be made in a very compact form with negligible weight of moving parts and preserving high fidelity of response in upper frequency ranges.

Transducers in accordance with the invention may be employed for the stereophonic reproduction of sound which has been recorded on a flat phonograph disc by the Westrex 45°—45° system or by the vertical-lateral system as used in England. Several methods already exist to convert the record grooves of the phonograph record into audible sound vibrations which are attempts to give true reproductions of the original recordings. These transducers employ such principles as: magnetic reluctance, ceramic voltage output when stressed, capacitance variance, crystal output understressing, and meter movements. In accordance with the present invention the transducer modulates radiation of light or some other source of radiant energy upon a photoelectric responsive element which, in a preferred embodiment of the invention, takes a form of a semi-conductor photoelectric cell. It has only one moving part and can be termed "sound on a light beam."

It has been known for a long time that photocells could be used to transform light energy into electric energy. I have found that by employing semi-conductor photoelectric cells instead of such photocells as the Scharz cell, I may not only provide a smaller, more compact unit, but may also increase greatly the frequency range so as to cover the frequency range needed for high fidelity standards. Moreover, a small compact phono cartridge may be constructed in accordance with my invention even when two cells are used together in a stereo application. In addition, in accordance with my invention I have overcome the problem of photocell fatigue with the passage of time. Moreover, I have obtained highly sensitive units which may employ small relatively low-power light sources.

The semi-conductor photoelectric stereophonic phonograph cartridge of my invention is based upon the principle of the semi-conductor photoelectric cell. It preferably utilizes semi-conductor photoelectric cells known as photo-transistors or photo-diodes. Two photoelectric elements may be employed, or if a push-pull connection of photoelectric elements is employed, there may be four semi-conductor photoelectric cells. Photo-transistors such as the British made S.T.C.P. 50A and P. 40A, which are germanium P-N junction diodes which may be exposed to light through a window, can be used, or the British-made Mullard OCP 71 may be used in the grounded emitter configuration with the base open circuit. This cell is a germanium doped P-N-P transistor enclosed in an optically homogeneous plastic case containing a dispersive medium to decrease the critical positioning necessary. American produced phototransistors are also usable, such as the Texas Instrument Transistor type #800, an NPN photo tube. Nucleonic Products Company, Inc., produces a germanium photodiode with a built-in lens for accurately focusing light on the sensitive portion of the junction area. The unit is hermetically sealed and can be used in the visible or infra-red portions of the spectrum. The sensitive surface is approximately 1 square millimeter, and the overall dimensions are only 15/64 inch x 15/64 inch and 7/64 inch thus making it suitable for use in miniaturized equipment.

Undoubtedly, there are other semi-conductors made in the United States which will satisfy the conditions necessary for a successful stereo or monaural phono cartridge.

The phonograph cartridge embodying my invention utilizes a subminiature light source such as a gaseous discharge lamp or neon tube or a tungsten filament type of lamp. Either direct current or alternating current may be employed for energizing the light source which will be explained more fully hereinafter. Although the invention is not limited to light sources of a particular manufacturer, I have found that satisfactory results may be obtained by the employment of a medical grain of wheat bulb, No. 162 produced by the General Electric Company or the No. 324. The wheat source lamp is 1/16 inch in diameter and 39/64 inch in length. This lamp uses voltage of 1½ to 3 volts at a current of 0.13 ampere. From the standpoint of initial cost and operating life, the General Electric lamp No. 324 is preferable although it is a little larger and, therefore, requires a somewhat greater size of cartridge. The General Electric lamp No. 324 is 5/32 inch in diameter and 0.438 inch in length. It runs on a voltage up to 3.0 volts and a current of 0.19 ampere. It has a lifetime of 350 hours at 3.0 volts.

The lifetime of such lamps is inversely proportional to the twelfth power of the voltage. Therefore, a 5% decrease in voltage will double the lifetime of the lamp. Thus, by operating the lamp at half voltage, its life may be extended far enough so that it will seldom have to be replaced. In carrying out the invention in accordance with a preferred form thereof, a light source is imbedded in a block having openings forming light passageways perpendicular to each other and photocells are mounted to be responsive to the light issuing through the two passageways.

A stereophonic needle carrying wings or light cut-off edges extending perpendicular to each other is so mounted that components of motion of the needle tip perpendicular to each other produce translational movement of the respective wing edges, whereby the cross-sectional area of the light beam reaching each photocell varies in proportion to one of components of motion of the needle tip; and the electrical output of each photocell reproduces one of the sound tracks. When the unit is utilized merely as a single channel transducer, one of the photoelectric cells and one of the wings may be omitted in which case the electrical output corresponds to the translational movement of the needle tip, its velocity or acceleration or other function of its motion according to the electrical circuit employed.

A better understanding of the invention will be afforded by the following detailed description considered in conjunction with the accompanying drawing which FIG. 1 is a view in cross section of a quadrature channel photoelectric transducer which may be employed as a stereophonic phonograph cartridge represented as cut by a plane 1—1 indicated in FIG. 2;

Like reference characters are utilized throughout the drawings to designate like parts.

Figure 1:
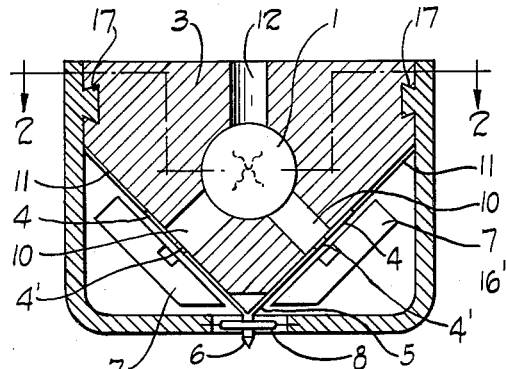
Figure 2:
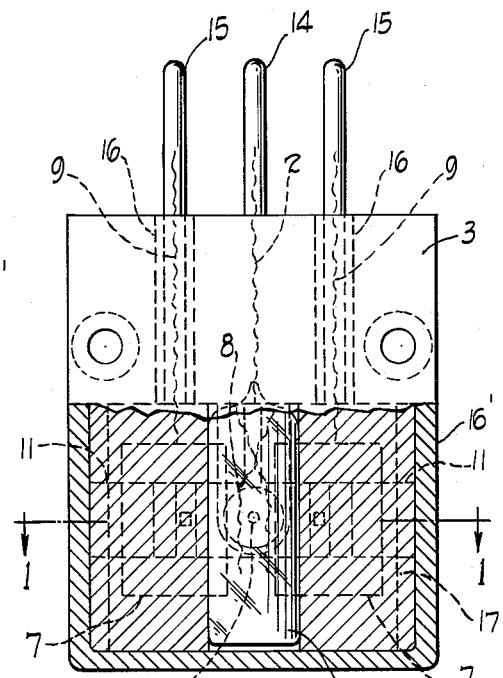
FIG. 2 is a view of a horizontal section of the cartridge of FIG. 1 represented as cut by a horizontal plane 2—2 indicated in FIG. 1.
Figure 3:
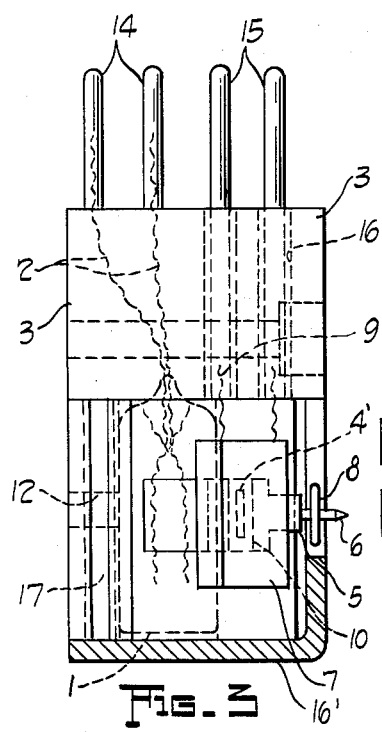
FIG. 3 is a view of a horizontal section of the cartridge of FIGS. 1 and 2.
Figure 4:
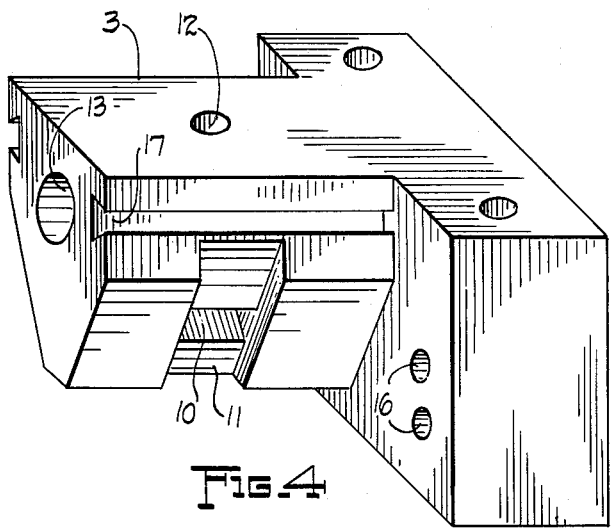
FIG. 4 is a perspective view of a lamp housing and light channel element for the unit of FIGS. 1 to 3.
Figure 5:
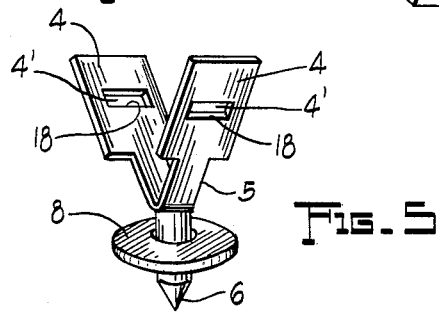
FIG. 5 is a view in perspective of the stylus and vane or wing assembly of the units of FIGS. 1 to 4.

The form of transducer illustrated in FIGS. 1 to 5 comprises an incandescent lamp 1 and connecting wires 2 embedded or molded in a plastic light pipe 3 which is shaped so as to channel the light across the two vibrating shutters 4 of a stylus and needle assembly 5. The shutters 4 are mounted at an angle of 90° to each other upon a stylus 6 and each shutter is formed with a slit 4'. Since both shutters are directly connected to the stylus 6, the shutters and the edges of the slits 4' are forced to move at the frequency and amplitude that stereo recording dictates when the needle 6 of the transducer is employed in tracking a stereo cut phonograph disc. In vertical motion their outputs would be equal.

The light pipe 3 is so fashioned as to project the light from the lamp 1 at right angles to the slits 4'; the light proceeds through the specially sized slits 4' and falls perpendicularly upon photo semi-conductor cells 7. The shutters 4 are made of a material which is opaque to light. The 90° arrangement of the two shutters or vanes 4 assures a faithful reproduction of the exact manner that the stylus traces out the record groove.

The Westrex 45°—45° system is in common use in the United States. The 90° angle assures that an optimum "no cross talk" condition exists for the cartridge when used stereophonically. The cartridge is perfectly compatible and can, of course, be used as a monaural cartridge. The slit and stylus assembly 5 can be made extremely small and light, weighing .6 milligram or less. The very low mass of the only moving part, the slit stylus assembly, assures my transducer of extremely high compliance characteristics and a very wide frequency range (2 c.p.s. to 50,000 c.p.s.). If photo-diodes are used, the frequency range can be extended to approximately 200,000 c.p.s. which is about 13 times the upper audible limit which the average person with excellent ears can hear. The low frequency of such a transducer is limited only by the preamplifier and power amplifier used with it.

Separate signals produced by separate and equal-strength, directed beams of light from the single light source 1 fall perpendicularly on separate photo semi-conductors 7. These two separate signals are then amplified separately since each one accurately represents one of the two stereo channels. They would produce equal strength signals if so directed by the record groove by equal vertical movement. The amplifier circuits are not shown since these do not constitute a part of my present invention and conventional preamplifiers and power amplifiers may be employed. When a light source of the brilliance of incandescent lamps is employed I have found that preamplifiers may be eliminated. However, if a less brilliant light source such as a discharge tube or glow lamp is used, for example, or if the signal is too small to be used directly, or if there is a great distance between the cartridge and the amplifier, a preamplifier or step-up transformer may be used, just as it is used for many of the existing capacitance and magnetic type phono cartridges.

A weak spring or resonance-free, treated synthetic rubber grommet 8 may be provided just under the diamond needle saddle or with the saddle of the needle 6 embedded in the grommet 8 to keep the stylus assembly 5 from bottoming when the pick up is lowered on the record or dropping out of its sliding groove. Since this needle and slit assembly 5 is so low in mass (about .6 milligram) it has very high compliance which requires an extremely low tracking force, probably less than 1.0 gram. This means almost no record wear, and is an additional advantage of my semi-conductor photoelectric transducer when employed as a stereophonic phonograph cartridge. High compliance is a requisite for good stereo performance.

Some care must be taken to assure that no stray light reaches the photo semi-conductor cells 7. The light pipe 3 is accordingly slotted or T-shaped and grooves 11 are formed in the light pipe 3 in which the shutters 4 may slide. The light pipe 3 may be made of opaque plastic with milled slots 10 for light passageways. The grooves 11 also maintain the proper alignment of the diamond stylus 6. Because of the simplicity of the stylus-shutter assembly 5, the whole assembly can be removed and inspected or thrown away or easily replaced when a diamond requires replacement. The tiny photo semi-conductors 7 and their respective wires 9 may also be molded or cemented in plastic.

Preferably an additional hole 12 is formed at the top of the light pipe 3 in order to provide a warning light for showing that the light source 1 is turned on and also for aid in cooling the light source. An opening 13 is formed at the front face of the light pipe 3 for insertion of the lamp 1 and a pair of plugs 14 is provided at the rear of the plastic light pipe 3 for electrical connection of the light source through leads 2. Plugs 15 are also provided for connection to the photo transistors 7 to carry the signals from the photo transistor 7 to preamplifiers (not shown). Shown are two mounting holes 16 through the light pipe 3 for insertion of the plugs 15.

An outside shell 16' is preferably provided for housing the photo transistors 7. Dovetail slots 17 are formed in the light pipe 3 and correspondingly shaped tongues making a slide fit with dovetail slots 17 are formed in the outside shell for securing the outside shell 16' to the light pipe 3. In order to change the needle assembly 5 the rubber grommet 8 is first removed and then the entire outer shell 16' is slipped off the light pipe 3. The needle assembly 5 then drops out of its groove 11. Reassembly is performed in the opposite manner.

Transistors are known for their ruggedness, especially when encased in plastic. Therefore, this molded type of construction assures rigidity of the component parts, which are kept in their optimum position. It makes the whole cartridge exceptionally durable; it is shock resistant, and its important parts are sealed from moisture, temperature gradients and dust.

There may be as many as six leads coming from the rear of the cartridge. Two are for the tiny sealed light source 1. This may be an alternating current or a direct current source; both designs could be utilized with the proper changes in circuitry. A direct current could be supplied easily by a selenium-type rectifier which would give a constant current to illuminate the subminiature light source 1. The other four leads would serve the two separate channels when used as a stereo cartridge and two could be wired in common in the regular manner of a monaural system when used monaurally. The whole cartridge can be sealed tight easily.

The preferred characteristics of the photoelectric cell to be used in my transducer are: (a) small size, (b) large current response, (c) not too critical positioning for maximum response, (d) a sufficiently wide frequency response, (e) small power consumption, (f) a satisfactory signal to noise ratio, (g) small weight. For satisfying these conditions semi-conducting photoelectric cells are superior to vacuum photo cells and photo multipliers.

The dark current of semi-conducting photo cells is extremely temperature sensitive, and in the case of P-N junction devices where the dark current is relatively large, variations in the dark current due to fluctuations in the ambient temperature are quite large. Since my transducer when used as a photoelectric stereophonic phonograph cartridge requires the detection of low levels of illumination from quite high frequencies down to direct current, an alternating current carrier frequency could be used in the incident light, and it is desirable to separate the signal due to incident light from that due to thermal fluctuation. This may be accomplished by chopping the light at frequencies as high as 200,000 cycles per second. There would have to be demodulation before the signal was amplified. Thermal noise may also be eliminated by employing two identical photocells in push-pull, one in the dark and the other illuminated with the light beam, so that the currents from each cell due to thermal fluctuation cancel.

In essence, the semi-conductor photoelectric cell 7 has a narrow beam of light impinging on it, which is rectangular in cross section, in a direction mutually perpendicular to the beam and long edge of the rectangular cross section. The narrower the incident beam, the smaller the photoelectric current. The minimum width of light beam is preferably so chosen that the currents measured are 20 times the current due to thermal fluctuation. To enable the smallest light beam width to be employed, the maximum light is required, but an intense light source would also cause a higher temperature to be present, although not necessarily a fluctuating temperature. The optimum size of the slit 4' then is determined by the heat generation of the light 1, the amount of the illumination needed to get the proper signal to noise ratio, and the frequency response needed.

For the photo transistors and photodiodes 7, the high frequency response depends upon the spread of origin of the carriers released by the incident light quanta, that is, the narrower the incident light beam, the higher is the obtainable frequency response. The capacity of the collector junction of the phototransistors and the P-N junction of the photodiodes also limits their high frequency response. The capacity may be reduced by increasing the applied voltage, but this also increases the noise. Further, the frequency response will depend on the load resistance, insofar as it determines the time constant of the photocell circuit. The S.T.C. P50A and P40A are 3 db down from the value at zero cycles at approximately 200,000 c.p.s. with a load resistance ($R_L = 100,000$ ohms) While for the phototransistors like Mullard OCP71, the same value is true at approximately 20,000 c.p.s. with ($R_L = 10,000$ ohms).

The noise for a given value of applied voltage does not seem to depend on the illumination of the phototransistor. The noise should be that of an ordinary transistor and no more. The Mullard OCP71 type, a phototransistor, can be used for frequencies under 50,000 c.p.s. Its high frequency performance falls off some from its low frequency value, but its low frequency sensitivity is ten times that for the photodiodes. For phototransistors the positioning of the incident beam is not as critical. At about 10 volts supply and an illumination of about 0.1 millilumen, a signal to noise ratio of about 50 to 1 should be possible at frequencies up to 50,000 c.p.s. The wave length of light for either the photodiodes, or the phototransistors for greatest efficiency in producing current is about 8,000 A. to 14,000 A. since they are made from doped germanium. Thus, there is an advantage in using near infra red radiation instead of "white" light.

My invention, therefore, is not limited to the employment of visible light.

With the modulated frequency of 20,000 cycles per second, and an illumination of about 0.1 millilumen, a photoelectric current of about 8 microamperes should be produced by the Mullard OCP71. This signal then requires amplification and a transistor amplifier or preamplifier would couple naturally to the OCP71 and is desirable from the point of view of size and power consumption.

Although I have described my invention particularly in connection with the use of white light or electromagnetic energy in the band close to the luminous band, such as infra red radiation, it is to be understood that my invention is not limited to such types of radiation or radiant energy. There are some semi-conductors which are sensitive to radiation such as infra red rays. Consequently, these can be used as sources with some similar slit system as described herein.

In the embodiment of FIGS. 1 to 5 inclusive, a stylus assembly 5 has been illustrated in which the vanes 4 are provided with slits 4'; the edge 18 of the slit 4', however, is the effective portion of the vane in controlling the cross-sectional area of the light beam, and, therefore, the response of the photocells 7. It will be understood, therefore, that my invention is not limited to the use of slitted vanes and that does not exclude the use of light weight shutters 21 as illustrated in FIGS. 6 and 7, each with an edge 22 which controls the amount of light reaching the photocells and with a portion 23 of each vane 21 cut away to lighten the moving structure.

The filaments of incandescent electric lamps have been found to be sufficiently rigid so that disturbing effects do not arise from any mechanical vibration of the filaments. However, in cases where the transducer is to be operated in frequency ranges where it is feared that filament vibration might create a problem, difficulties therefrom may be avoided by selecting filaments so mounted and constructed that the natural frequency of vibration of the filaments is outside the operating frequency within which it is intended to employ the transducer. It will be understood also that the invention does not exclude the employment of translucent transmitting or reflecting surfaces as the light source illuminated by a more distantly placed filament so that any filament vibration is not reproduced in the response of the photocells.

Other types of light sources may also be employed. For example, as illustrated in FIGS. 6, 7 and 8 a gaseous discharge light source in the form of a neon tube 24 may be employed having electrodes 25 and 26, only one of which is substantially illuminated when the tube is energized by direct current. Preferably the tube 24 is so connected electrically that the luminous glow surrounds the lower electrode 26 and the tube 24 is mounted with the electrode 26 at the intersection of the light paths to the cells 7.

Figure 6:
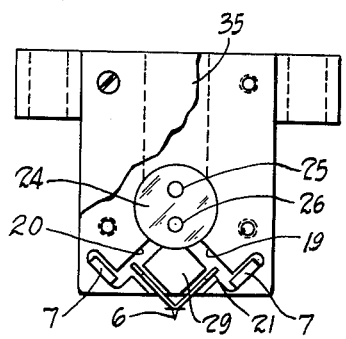
FIG. 6 is a view in elevation of another embodiment of the invention employing a gaseous discharge tube instead of a filament type lamp represented with a cover plate removed.
Figure 7:
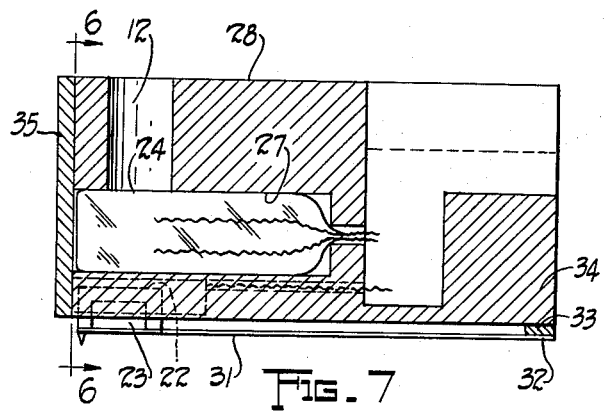
FIG. 7 is a view of a vertical longitudinal mid-section of the embodiment of FIG. 6.
Figure 8:
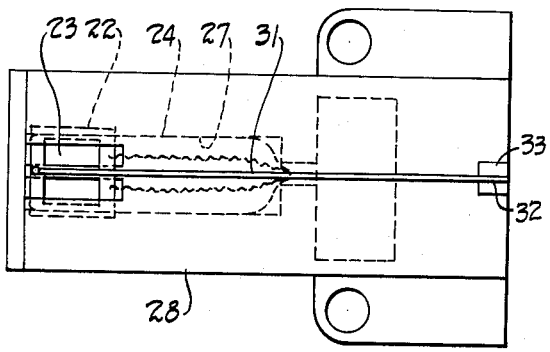
FIG. 8 is a plan view of the embodiment of FIGS. 6 and 7.

In the embodiment of FIGS. 6, 7 and 8, a socket 27 is formed in a light pipe or plastic mounting unit 28 for receiving the tube 24. The plastic block 28 has been shown as formed with a portion 29 defining with walls 19 and 20, a pair of perpendicular light channels. It will be understood, however, that the invention does not exclude the use of a lamp mounting block from which the portion 29 has been excluded since the effective width of the light beam from the electrode 26 impinging upon the photocells 7 is not affected by the presence of the block portion 29 but is determined only by the position of the vane 21, which determines the distance between the edge 22 of the vane 21 and the surface or wall 19 or 20. Inasmuch as in the standard Westrex system of stereophonic recording with the grooves cut at 45°—45° or the British system with the grooves at 0° and 90°, the needle point excursions representing the two audio channels are at 90° to one another, therefore, the plastic block 28 should be formed with the surfaces 19 and 20 very precisely perpendicular to each other. Although for mechanical and manufacturing convenience, the vanes 21 are preferably at right angles, the precise angular relationship does not effect the fidelity of the reproduction as it is only the movement of the edges 22 which affects the photocells 7.

The invention is not limited to employment of a specific type gaseous discharge lamp, however, satisfactory results have been obtained by the employment of a neon bulb manufactured by the General Electric Company under the designation NE2h.

In the embodiment of FIGS. 1 to 5 inclusive, a stylus assembly 5 is supported and located by means of a grommet 8. However, the invention is not limited to this type of mounting and a very free high compliance mounting may be obtained as shown in FIGS. 6 and 7 by mounting the stylus unit including the vanes 21 upon a shaft 31 of sufficient length, as shown, to form a cantilever having a negligible bending force for the needle 6 to follow the record groove. The supported end 32 of the cantilever 31 is secured by rivets, cement or other suitable means with an interposed block 33, if desired, to the right hand end 34 of the lower surface of the light pipe 28.

If the photocells 7 are of the photodiode or phototransistor type, a high degree of sensitivity is obtained which is desirable when employing a gaseous discharge type of light source such as a neon tube. However, I have found that satisfactory results may be employed, especially when utilizing an incandescent lamp as the light source, by employing solar cells of the silicon type as the photoelectric response elements. These have the advantage of very fast response time.

As in the embodiment of FIGS. 1 to 5, the needle 6 may be of the diamond type which is cemented or riveted to the stylus assembly. However, the vanes 21 and the shaft 31 may be composed of plastic material such as nylon cemented together or preferably forming an integral unit. A plastic closure plate 35 may be provided for the light pipe 28.

Figure 9:
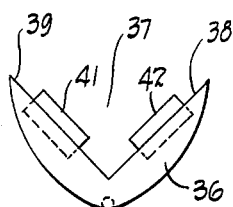
FIG. 9 is a schematic diagram of another embodiment of the invention employing a V-notch vane with perpendicular edges instead of a vane element having perpendicular wings.
Figure 10:
FIG. 10 is a side view of the vane and needle of the embodiment of FIG. 9 illustrating the cantilever mounting arrangement.
Figure 11:
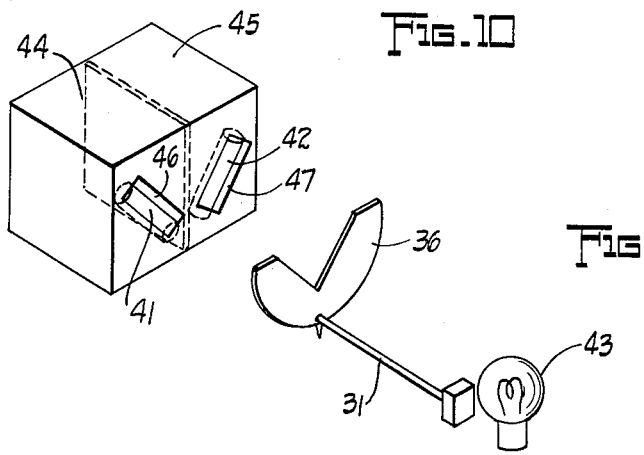
FIG. 11 is a perspective view of the embodiment of FIGS. 9 and 10 illustrating the relationship between the lamp, V-notch vane and photoelectric cells for the two quadrature channels.

If desired, the moving vane portion of the stylus assembly may be in a single plane as illustrated in the embodiment of FIGS. 9, 10 and 11. In this embodiment of the invention a flat V-notch vane 36 is secured to or formed integral with the nylon shaft 31. The vane 36 is cut-out at 37 to form two perpendicular light shutter edges 38 and 39, so arranged as to modulate the amount of light falling upon the photo-responsive elements such as photo-transistors 41 and 42, respectively, which are mounted as shown in FIGS. 9 and 11 at an angle to each other. The physical relationship between the shutter or vane 36 and the photocells and lamp source is such that the vane 36 lies between a light source 43 and the photocells 41 and 42. The entire assembly is enclosed within an opaque light pipe or housing, not shown for simplicity of the drawing.

Consequently, as the shutter 36 is deflected in different directions in its plane in response to the action of the needle 6 in tracking the record, shadows move back and forth across the faces of photocells 41 and 42. Prefer- ably the housing is formed with two independent light-tight boxes or housings 44 and 45 having windows 46 and 47, respectively, through which the photocells 41 and 42 are exposed, thus preventing the modulation of light on one photocell from affecting that upon the other. Referring to FIG. 9, it will be apparent that if there is a signal in only one channel, one or the other of the edges 38 or 39 will travel parallel to itself so that the amount of light falling upon the corresponding photocell will be unaffected, whereas the other edge will have traveled perpendicular to itself producing maximum modulation of the other photocell. If there are signals in both channels, the movement of the needle 6 will produce components of motion of the shutter edges 38 and 39 in each of the perpendicular directions, causing both photocells to be modulated according to the respective channel signals.

Figure 12:
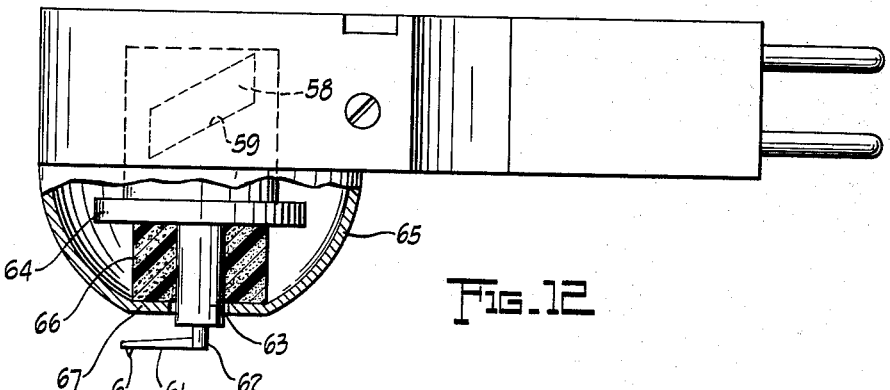
FIG. 12 is a side elevation, partially in section, of another embodiment of the invention employing a cylindrical light cut-off element having both rotational and axial components of movement in response to needle tracking.
Figure 13:
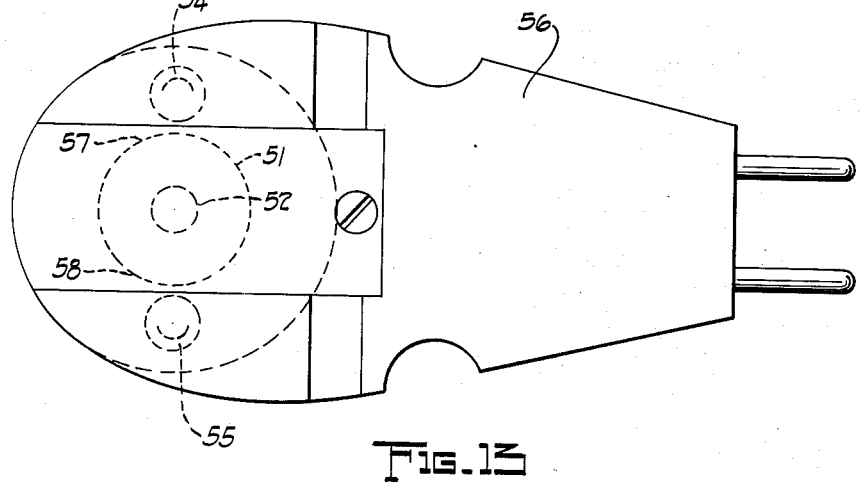
FIG. 13 is a plan view of the embodiment of FIG. 12.
Figure 14:
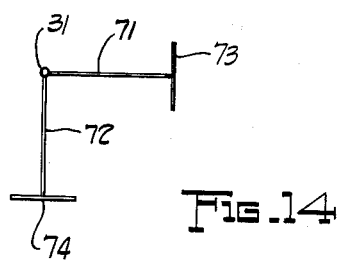
FIG. 14 is a diagram of a microphone embodying my invention.

Another form of shutter motion which may be employed for modulating the photocells in response to needle movements is illustrated in FIGS. 12 and 13, where a cylindrical shutter 51 is employed having a light source in the form of a lamp 52 mounted centrally and coaxially of the shutter 51 with photocells 54 and 55 on either side within the mounting head or cartridge 56.

The cylindrical shutter 51 is formed with two diametrically opposite diagonally extending slits 57 and 58.

Each of the slits 57 and 58 has a light cut-off edge 59 which is the effective functional portion of the slit. The slopes of the slits 57 and 58 follow opposite or reverse spirals. Consequently, when the cylinder 51 travels upward and counter-clockwise, the exposure of one of the photocells 55 to the slit 58 is unchanged whereas that to the slit 57 is modulated with a maximum change. On the contrary where the motion of the cylinder 51 is upward and clockwise, there is no modulation of the second photocell but maximum modulation of the first photocell.

The needle 6 may be secured to the lower edge of the cylinder 51 but preferably, as shown, it is mounted upon an arm 61 secured to a shaft 62 extending from a stem 63 integral with the hollow cylinder 51 or joined thereto by means of a shoulder member 64.

For supporting the cylinder 51 with freedom of motion around its axis as well as in a vertical direction, a substantially hemispherical supporting cup 65 may be secured to the head 56 with a vibration damping compliant bushing 66 of a suitable material such as foam polyurethane, for example, interposed between the collar 64 and a shelf 67 formed on the mounting cup 65.

The invention is not limited to a specific arrangement of elements. When the transducer is employed as stereo microphone, however, and primary concern is to reproduce sounds which will indicate to the listener the relative positions in plan or upon a surface or floor of various sound sources or musical instruments, the cartridge is mounted to respond selectively to sounds from perpendicular directions. A cartridge in the form of FIGS. 6 to 11, for example, has the shaft 31 vertical. The free end corresponding to that to which the needle 6 is connected in FIG. 6 is connected by struts or ligaments 71 and 72 to sound pressure responsive diaphragms 73 and 74 mounted at right angles to each other in perpendicular vertical planes. In this manner a sound wave having a maximum intensity along the axis perpendicular to the diaphragm 73 will produce oscillation of the shaft 31 in one direction and likewise a sound wave having maximum content in a direction perpendicular to diaphragm 74 will produce oscillation of the shaft 31 in a direction transverse to the first-mentioned direction of oscillation.

I have herein shown and particularly described certain embodiments of my invention and certain methods of operation embraced therein, for the purpose of explaining its principle of operation and showing its application, but it will be obvious to those skilled in the art that many modifications are possible and I aim, therefore, to cover all such modifications and variations as fall within the scope of my invention which is defined in the appended claims.

It is, therefore, particularly pointed out and distinctly claimed as the invention:

1. A transducer comprising in combination a light pipe, a lamp mounted therein, the light pipe having two surfaces perpendicular to each other exposed to the illumination of the lamp and each defining the boundary of a light channel, a shutter element mounted with freedom of movement in various directions within a plane having a pair of light cut-off edges, each substantially parallel to one of the light channel bounding surfaces of the light pipe, the mounting of the shutter element being such that each of said light cut-off edges may move parallel to one of said surfaces or perpendicular thereto or with both components of motion, but substantially without canting so as to interfere with the parallel relationship of each light cut-off edge with respect to the corresponding light channel bounding surface, a pair of photo responsive elements each mounted in the vicinity of one of said light channel bounding surfaces beyond one of said shutter light cut-off edges, whereby each of said edges casts a shadow upon one of said photo responsive elements, and shutter movement of the light cut-off edge perpendicular to one of said light channel bounding surfaces causes the edge of such a shadow to move across the photo responsive element whereas movement of a light cut-off edge parallel to the corresponding light channel bounding surface leaves the amount of light impinging upon the corresponding photo responsive element unchanged and the modulation of light impinging upon the photo responsive elements represents the components of motion in two different directions, perpendicular to each other of the shutter element.

2. A transducer comprising in combination a substantially right circular cylindrical shutter mounted movable axially and rotatable on its axis, a lamp mounted within the shutter, a pair of photocells mounted outside the shutter at different angular positions with respect to the lamp and the axis of the shutter, the shutter having a pair of light cut-off edges each casting a shadow of the lamp upon one of the photoelectric cells, the light cut-off edges lying tangent to reverse spirals along the cylindrical shutter surface whereby a rising counter-clockwise movement of the shutter modulates light falling upon one of the photocells without affecting the light falling upon the other photocell and a rising clockwise movement of the shutter modulates light falling upon the second photocell without affecting that falling upon the first.

3. A transducer comprising in combination a movable shutter element having freedom of movement in transverse directions and having a pair of radiation cut-off edges, a radiation source having a surface of light diffusing type illuminated by a lamp whereby the effective position of the radiation source is substantially unaffected by lamp vibration or feed back effects, and a pair of radiation responsive elements each so mounted that the shutter element lies between the radiation source and the radiation responsive elements and each radiation cut-off edge of the shutter element casts a shadow upon one of the radiation responsive elements, the radiation responsive elements being angularly spaced, whereby components of the motion of the shutter element at predetermined angles to each other each cause the edge of the shadow upon one of the radiation responsive elements to move across the radiation responsive element without affecting the other radiation responsive element.

4. An apparatus as in claim 3 wherein the light diffusing surface is a nonspecular reflecting surface.

5. An apparatus as in claim 3 wherein the light diffusing surface is an opal glass type light transmitting sheet.

6. An apparatus as in claim 3 in which the shutter element is mounted upon the end of a flexible cantilever.

7. An apparatus as in claim 6 wherein the shutter element is comprised of a pair of vanes extending angularly to each other and having radiation cut-off edges substantially parallel to the cantilever.

8. An apparatus as in claim 6 in which the shutter element comprises a V-notch vane, substantially perpendicular to the cantilever, with a notch cut therein having a pair of radiation cut-off edges substantially perpendicular to each other.

9. Apparatus for translating stereophonically produced grooves from a record into corresponding electrical signals respectively for activating electro-responsive sound reproducing devices and comprising in combination, a housing opaque to electromagnetic radiation, a source of electromagnetic radiation within said housing, a pair of electromagnetic radiation responsive devices each including means for converting such radiation into an electrical signal, means for guiding the radiation from said source in two independent and confined paths disposed normal to each other, means supporting the radiation responsive devices within the housing in position to independently intercept said radiation paths respectively, a pair of masking means each including an electromagnetic-radiation opaque member having an aperture therethrough and each disposed for relative movement across a corresponding radiation path respectively with its aperture intersecting said path, a stylus for engaging and following the record grooves, means connecting the stylus to each of said masking means for unitary movement therewith, and means for resiliently supporting said stylus and masking assembly within the housing with the stylus extending therethrough for engagement with the record grooves.

10. The apparatus of claim 9 wherein said housing is opaque to light, wherein said source of electro-magnetic radiation is a source of light, wherein said electro-magnetic-radiation responsive devices are light-responsive, and wherein said masking members are each opaque to light.

11. A stereophonic phonograph pick-up device comprising in combination, a source of electro-magnetic radiation, means for confining and directing the radiation from said source in two paths disposed normal to each other, a pair of radiation responsive devices for converting said radiation into corresponding electrical signals, movable means intercepting each path and adapted to independently modulate the radiation passing therethrough, stylus means adapted to engage a stereophonically produced record groove operatively coupled for unitary movement with said modulating means, a housing opaque to electromagnetic radiation including the source and modulating means and having a stylus aperture therethrough, and means for resiliently supporting the stylus in said housing aperture for relative motion therein in response to stylus engagement with a stereophonic record groove.

12. The pick-up of claim 11 wherein said source of electromagnetic radiation is a source of light, wherein said radiation responsive devices are responsive to light, and wherein said housing is opaque to light.

13. The pick-up of claim 11 wherein said modulating means includes a pair of radiation opaque members each having an aperture therethrough adapted to intersect a corresponding radiation path, and means coupling said stylus and each of said opaque members together for unitary movement of the apertures across each radiation path respectively.

14. The pick-up of claim 11 wherein said source of radiation is a fluctuating source, and means for isolating the fluctuations from the electrical output of each of said radiation responsive devices.

15. The pick-up of claim 11 wherein said radiation responsive devices each include means for isolating their respective electrical outputs from extraneous signals not directly produced by the stereophonic record groove.

16. A stereophonic microphone comprising in combination a source of radiation, a shutter composed of material opaque to the source of radiation and moveable in transverse directions, diaphragm means connected to the shutter means responsive to pressure waves from transverse directions for deflecting the diaphragm in transverse directions in response to variations in pressure waves, and a pair of radiation responsive elements, the shutter being interposed between the source of radiation and the responsive elements and having a pair of radiation cut-off edges, each cooperating with one of the responsive elements, each light cut-off edge and the corresponding radiation responsive element constituting a modulation unit, the angular relationship between the modulation units being such that one responsive element is modulated for one component of motion of the cut-off element and the other is modulated for a transverse component of motion of the cut-off element.

References Cited by the Examiner

UNITED STATES PATENTS

| | | | |
|---|---|---|---|
| 2,093,540 | 9/1937 | Blumlein | 179—100.41 |
| 2,320,879 | 6/1943 | McIlvaine | 179—100.41 |
| 2,864,897 | 12/1958 | Kaar | 179—100.41 |
| 2,931,027 | 3/1960 | Blefary et al. | 88—1 |
| 2,934,610 | 4/1960 | Dieter | 179—100.41 |
| 2,952,817 | 9/1960 | Kennedy | 331—68 |
| 2,958,786 | 11/1960 | Millis | 179—100.41 X |
| 3,127,481 | 3/1964 | Herve | 179—100.41 |

BERNARD KONICK, *Primary Examiner.*

STEPHEN W. CAPELLI, *Examiner.*

M. KIRK, *Assistant Examiner.*